US011966916B2

(12) United States Patent
Guo et al.

(10) Patent No.: US 11,966,916 B2
(45) Date of Patent: *Apr. 23, 2024

(54) RESOURCE TRANSFER METHOD AND APPARATUS, STORAGE MEDIUM, AND COMPUTER DEVICE

(71) Applicant: TENCENT TECHNOLOGY (SHENZHEN) COMPANY LIMITED, Shenzhen (CN)

(72) Inventors: Rui Guo, Shenzhen (CN); Maocai Li, Shenzhen (CN); Jun Liang, Shenzhen (CN); Jianjun Zhang, Shenzhen (CN); Zongyou Wang, Shenzhen (CN); Haitao Tu, Shenzhen (CN); Qi Zhao, Shenzhen (CN); Binhua Liu, Shenzhen (CN); Dawei Zhu, Shenzhen (CN); Qing Qin, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 0 days.

This patent is subject to a terminal disclaimer.

(21) Appl. No.: 18/114,076

(22) Filed: Feb. 24, 2023

(65) Prior Publication Data
US 2023/0214824 A1 Jul. 6, 2023

Related U.S. Application Data

(63) Continuation of application No. 16/523,764, filed on Jul. 26, 2019, now Pat. No. 11,645,649, which is a
(Continued)

(30) Foreign Application Priority Data

Jun. 12, 2017 (CN) .......................... 201710438933.2

(51) Int. Cl.
G06Q 20/38 (2012.01)
G06Q 20/10 (2012.01)
(Continued)

(52) U.S. Cl.
CPC ..... G06Q 20/38215 (2013.01); G06Q 20/105 (2013.01); G06Q 20/389 (2013.01);
(Continued)

(58) Field of Classification Search
CPC .......... G06Q 20/38215; G06Q 20/105; G06Q 20/389; G06Q 20/10; G06Q 40/04;
(Continued)

(56) References Cited

U.S. PATENT DOCUMENTS 10,586,062 B1 * 3/2020 Rangan ............... G06F 21/6209
10,833,843 B1 11/2020 Vijayvergia et al.
(Continued)

FOREIGN PATENT DOCUMENTS

CN 105809062 A 7/2016
CN 105976231 A 9/2016
(Continued)

OTHER PUBLICATIONS

Sankar et al. "Survey of Consensus Protocols on Blockchain Applications", 2017 International Conference on Advanced Computing and Communication Systems (ICACCS—2017), Jan. 6-7, 2017, 5 pages (Year: 2017).*
(Continued)

Primary Examiner — James D Nigh
(74) Attorney, Agent, or Firm — ARENTFOX SCHIFF LLP

(57) ABSTRACT

A second blockchain system receives a first consensus message from a first blockchain system, the first blockchain system includes first nodes that provide services to at least a first account, and the second blockchain system includes
(Continued)

second nodes that provide services to at least a second account. The first consensus message indicates a first plurality of the first nodes reaches a consensus for transferring a resource from the first account to the second account. The second blockchain system transfers the resource in the task to the second account. The transferring includes that a node in the second nodes adds the resource to the second account and generates a fourth block that records a completion of a transfer event. A second consensus message is transmitted from the second blockchain system to the first blockchain system in response to a second plurality of the second nodes completing the transfer event.

20 Claims, 5 Drawing Sheets

Related U.S. Application Data continuation of application No. PCT/CN2018/090682, filed on Jun. 11, 2018.

(51) Int. Cl.
| | | |
|---|---|---|
| *G06Q 40/04* | (2012.01) | |
| *H04L 9/00* | (2022.01) | |
| *H04L 9/32* | (2006.01) | |
| *H04L 9/40* | (2022.01) | |

(52) U.S. Cl.
CPC ............ *G06Q 40/04* (2013.01); *H04L 9/3265* (2013.01); *H04L 9/50* (2022.05); *H04L 2209/56* (2013.01)

(58) Field of Classification Search
CPC ..... G06Q 2220/00; H04L 9/3265; H04L 9/50; H04L 9/3239; H04L 2209/56; H04L 63/12
USPC .......................................................... 705/65
See application file for complete search history.

(56) References Cited

U.S. PATENT DOCUMENTS

| | | | | |
|---|---|---|---|---|
| 2016/0342980 | A1* | 11/2016 | Thomas | ............... G06Q 20/401 |
| 2017/0103468 | A1 | 4/2017 | Orsini et al. | |
| 2017/0134161 | A1 | 5/2017 | Goeringer et al. | |
| 2017/0243214 | A1 | 8/2017 | Johnsrud et al. | |
| 2018/0054491 | A1* | 2/2018 | Mankovskii | .......... H04L 67/142 |
| 2018/0089638 | A1* | 3/2018 | Christidis | .......... G06Q 10/0639 |
| 2018/0189312 | A1* | 7/2018 | Alas | ...................... H04L 9/3239 |
| 2018/0204191 | A1* | 7/2018 | Wilson | ...................... H04L 9/30 |
| 2018/0260888 | A1* | 9/2018 | Paolini-Subramanya | ................... G06Q 40/03 |
| 2018/0341775 | A1* | 11/2018 | Gisolfi | ..................... G06F 21/64 |
| 2020/0074450 | A1* | 3/2020 | Fletcher | ................ H04L 9/0637 |
| 2020/0204346 | A1* | 6/2020 | Trevethan | ............. H04L 9/3271 |

FOREIGN PATENT DOCUMENTS

| | | |
|---|---|---|
| CN | 106656839 A | 5/2017 |
| CN | 106780032 A | 5/2017 |
| CN | 107301536 A | 10/2017 |

OTHER PUBLICATIONS

Seibold et al. "Consensus: Immutable Agreement for the Internet of Value", KPMG, Jun. 29, 2016, 28 pages (Year: 2016).*
Buterin, Vitalik, "Chain Interoperability," R3 Reports, Sep. 9, 2016, 20 pages.
Extended European Search Report in EP18818253.9, dated May 19, 2020, 7 pages.
Greenspan, Gideon, "MultiChain Private Blockchain—White Paper," 2015. Retrieved from the Internet <URL: https://www.multichain.com/download/MultiChain-White-Paper.pdf>, 17 pages.
International Search Report and Written Opinion in PCT/CN2018/090682, dated Sep. 6, 2018, 10 pages.
Li et al., "EtherQL: A Query Layer for Blockchain System," International Conference on Database Systems for Advanced Applications, Mar. 22, 2017 [retrieved from the Internet Feb. 16, 2022]. Retrieved from the Internet <URL: https://link.springer.com/chapter/10.1007/978-3-319-55699-4_ 34>, 16 pages.
Office Action in CN201710438933.2, dated May 5, 2019, 11 pages.
Sankar et al., "Survey of Consensus Protocols on Blockchain Applications," 2017 International Conference on Advanced Computing and Communication Systems (ICACCS—2017), Jan. 6-7, 2017, 5 pages.
Seibold et al., "Consensus: Immutable Agreement for the Internet of Value," KPMG, Jun. 29, 2016, 28 pages.
Supplementary European Search Report in EP18818253.9, dated Jun. 8, 2020, 1 page.
Wang et al., "Blockchain Router: A Cross-Chain Communication Protocol," IEEA, Mar. 29, 2017, pp. 94-97.

* cited by examiner

RESOURCE TRANSFER METHOD AND APPARATUS, STORAGE MEDIUM, AND COMPUTER DEVICE

RELATED APPLICATION

The present application is a continuation of application Ser. No. 16/523,764, filed on Jul. 26, 2019, which is a continuation of International Application No. PCT/CN2018/090682, filed on Jun. 11, 2018, which claims priority to Chinese Patent Application No. 201710438933.2, filed on Jun. 12, 2017. The entire disclosures of the prior applications are hereby incorporated by reference in their entirety.

FIELD OF THE TECHNOLOGY

The disclosure relates to the field of network technologies.

BACKGROUND OF THE DISCLOSURE

As network technologies develop, accounts can interact conveniently based on a network, for example, chat with each other, interact in a game, and transfer a resource such as money based on a network.

An example in which a resource transfer process is a money transfer process is used. When a computer device receives a transfer request from an account A to an account B, the computer device may transfer the amount to the account B, as requested by the account A, and store the transfer request in a block chain to record the transfer event.

The foregoing resource transfer process is performed based on a block chain system. However, in an actual application scenario, the computer device may have deployed a plurality of block chain systems, and each block chain system serves some accounts. Therefore, a problem as to how to transfer a resource between accounts served by different block chain systems is to be resolved urgently.

SUMMARY

Embodiments of the disclosure provide a resource transfer method and apparatus, a storage medium, and a computer device. The disclosure provides a method of transferring a resource between accounts served by a plurality of block chains. The plurality of block chains may run based on the same consensus algorithm, for example, a Practical Byzantine Fault Tolerance algorithm (PBFT). Moreover, an advantage of decentralizing the block chains is maintained, no intermediate node device is accessed, and an event is executed based on a consensus reached by block chain node devices, so that credibility and reliability of executing the event are improved.

According to aspects of the application, an apparatus including processing circuitry and a method are described. When receiving a cross-chain transaction request to transfer a resource from a first account to a second account, the processing circuitry is configured to generate a task corresponding to the first account. The task can indicate conditions for implementing events in transferring the resource. A first blockchain system provides services for the first account, and a second blockchain system different from the first blockchain system provides services for the second account. The processing circuitry transfers the resource to the second account based on the task when a first plurality of first nodes in the first blockchain system reaches a consensus on a generation event of the task and updates a task status of the task to being finished when a plurality of second nodes in the second blockchain system reaches a consensus on a transfer event of the resource.

In an example, the processing circuitry is configured to generate, based on the cross-chain transaction request and a block header of a first block in a first blockchain of the first blockchain system, a second block in the first blockchain. The first block is a previous block of the second block in the first blockchain, and the second block records the generation event of the task.

In an example, the processing circuitry is configured to generate, based on a first consensus message and a block header of a third block in a second blockchain of the second blockchain system, a fourth block in the second blockchain. The third block is a previous block of the fourth block in the second blockchain, the first consensus message indicates that the first plurality of first nodes reaches the consensus on the generation event of the task, and the fourth block records the transfer event of the resource.

In an example, the processing circuitry is configured to generate, based on a second consensus message and a block header of a fifth block in the first blockchain, a sixth block in the first blockchain. The fifth block is a previous block of the sixth block in the first blockchain, the second consensus message indicates that the plurality of second nodes reaches the consensus on the transfer event of the resource, and the sixth block records the status update event of the task.

In an example, the processing circuitry is configured to receive a first consensus message that is triggered when the first plurality of first nodes reaches a preset number. The first consensus message indicates that the first plurality of first nodes reaches the consensus on the generation event of the task. The processing circuitry is configured to transfer the resource to the second account based on the task and the first consensus message.

The processing circuitry can be configured to receive a second consensus message that is triggered when the plurality of second nodes reaches a preset number where the second consensus message indicates that the plurality of second nodes reaches the consensus on the transfer event of the resource. The processing circuitry can be configured to update the task status to being finished based on the task and the second consensus message.

The processing circuitry can be configured to trigger a third consensus message when the second plurality of first nodes reaches a preset number where the third consensus message indicates that the second plurality of first nodes reaches the consensus on the status update event of the task.

The processing circuitry can be configured to receive a task status query message. Further, the processing circuitry can be configured to trigger a first consensus message indicating that the first plurality of first nodes reaches the consensus on the generation event of the task when a plurality of first nodes indicating that the task status is unfinished reaches a preset number.

The processing circuitry can be configured to receive a resource transfer status query message. When receiving confirmations from a preset number of the second nodes that the transfer event of the resource is completed, the processing circuitry triggers a second consensus message indicating that the plurality of second nodes reaches the consensus on the transfer event of the resource.

In an example, the task comprises information of at least one of: a task identifier, the second account, an identifier of the second blockchain system, a task status of the task, and a transaction number of the cross-chain transaction.

Aspects of the disclosure also provide a non-transitory computer-readable storage medium storing instructions which when executed by a computer cause the computer to perform the method.

In the embodiments of the disclosure, when a resource is transferred between accounts served by different block chain systems, a contract (or a task) is generated to indicate conditions for executing various events in the resource transfer process. After node devices on a first block chain system reach a consensus on a generation event of the contract, the node devices transfer a resource agreed in the contract to a second account based on the contract. After node devices on a second block chain system reach a consensus on a transfer event of the resource, the node devices update a contract state of the contract to a finished state. Therefore, the resource is transferred based on consensus processes reached by different block chain systems, and a method of transferring a resource between accounts served by the different block chain systems is provided. Moreover, because the transfer event of the resource and a state update event of the contract are executed based on the consensus of the block chain systems without intervening of an intermediate node device an advantage of decentralizing the block chain systems is still maintained, and credibility and reliability of executing the event are improved.

BRIEF DESCRIPTION OF THE DRAWINGS

To describe the technical solutions in the embodiments of the disclosure more clearly, the following briefly describes the accompanying drawings for describing the embodiments. The accompanying drawings in the following description show merely some embodiments of the disclosure, and a person of ordinary skill in the art may still derive other drawings from these accompanying drawings.

DESCRIPTION OF EMBODIMENTS

To make objectives, technical solutions, and advantages of the disclosure clearer, the following further describes in detail implementations of the disclosure with reference to the accompanying drawings.

Figure 1:
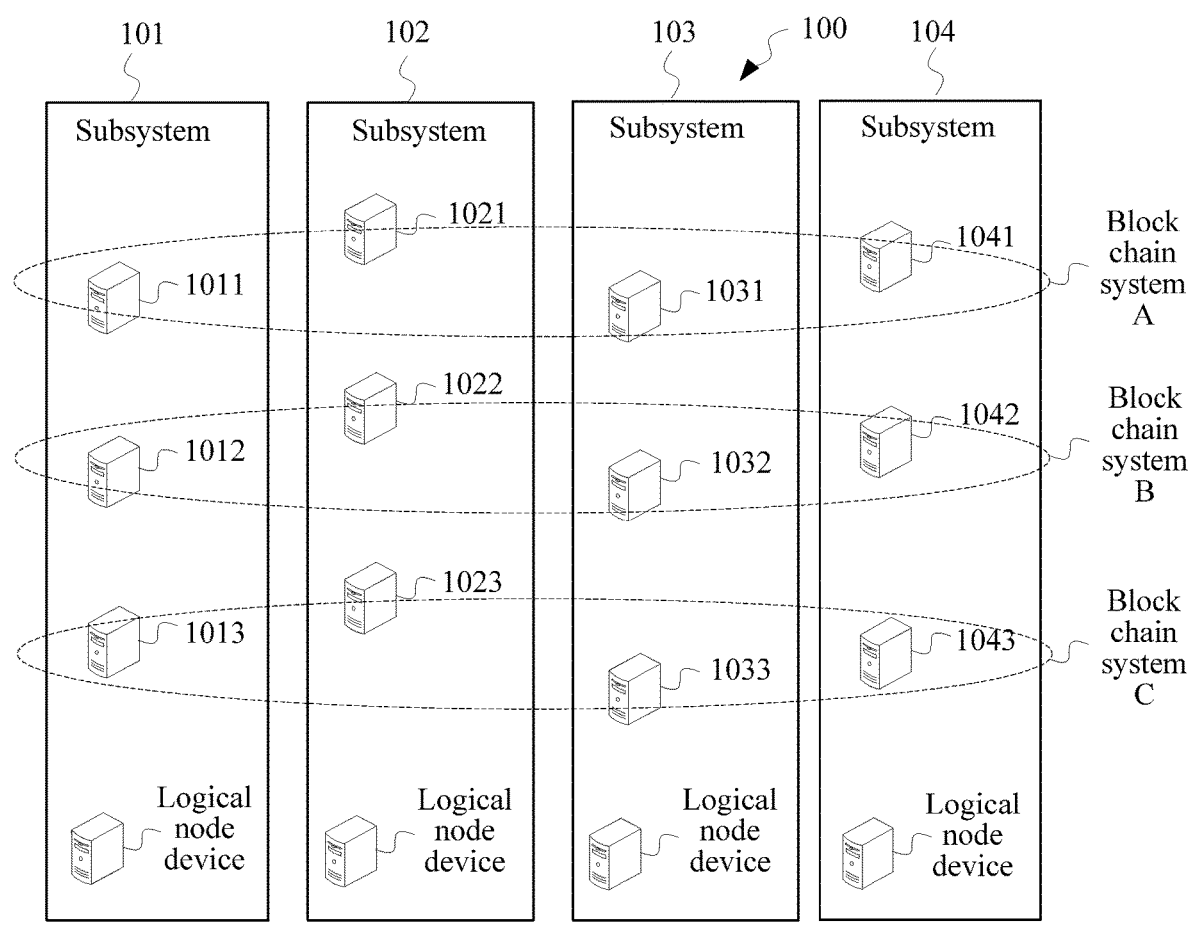
FIG. 1 is a schematic diagram of a service data processing system 100 according to the disclosure.

FIG. 1 is a schematic diagram of a service data processing system 100 according to the disclosure. As shown in FIG. 1, the service data processing system 100 is configured to process a service of transferring a resource. The resource is a resource during network transaction, for example, a monetary resource included in an online bank, a monetary resource stored in a social application account, virtual currency in a game or a digital bill in a virtual card bag, or the like. The service data processing system 100 can be configured to process one or more transaction requests including cross-chain transaction requests. In an example, a transaction request is a resource transfer request and a cross-chain transaction request is a cross-chain resource transfer request.

In an embodiment, the service data processing system 100 is configured to generate, when receiving a cross-chain transaction request, such as from a first account, to transfer a resource from the first account to a second account, a contract (also referred to as a task) corresponding to the first account. The contract can indicate conditions for implementing events in transferring the resource. A first block chain system (or a first blockchain system) can provide service(s) for the first account and a second block chain system (or a second blockchain system) that is different from the first blockchain system can provide service(s) for the second account. The service data processing system 100 can be configured to transfer the resource to the second account based on the contract when a first plurality of first nodes in the first blockchain system reaches a consensus on a generation event of the contract. Further, the service data processing system 100 can update a contract status (also referred to as a task status) of the contract to being finished when a plurality of second nodes in the second blockchain system reaches a consensus on a transfer event of the resource. The service data processing system 100 can reach a consensus on a status update event of the contract by a second plurality of first nodes in the first blockchain system.

A terminal may be a terminal in which a user served by the service data processing system 100 is located, and is configured to interact with the service data processing system 100, thereby transferring a resource from an account of the user to another account, managing a resource stored in an account based on the service data processing system, or the like. The service data processing system 100 is configured to manage a resource in the account of the user, generate a contract in a resource transfer process, and store an interaction message, contract information (also referred to as task information), for example, a contract state (also referred to as a contract status, a task status), or account information (for example, an account balance) as a block on a block chain. The account of the user is an account associated with a user logging in to the terminal, and is for example, an online bank, a social application account, a game account, or the like of the user. The account is used to store the resource of the user. The resource may further be any network resource, for example, a virtual object or a virtual bill. Correspondingly, the resource transfer may mean transferring ownership of the resource.

The service data processing system 100 may include a plurality of subsystems. One node device in each subsystem may be provided with a block chain system (also referred to as a blockchain system). Each block chain system is used to provide a service for one user group, to be specific, provide a service for an account of each user in the user group. A plurality of node devices that is in the plurality of subsystem and that is provided with the same block chain system may be referred to as block chain node devices corresponding to the block chain system, so that the block chain system provides a service for an account based on a consensus of the node devices deployed with the block chain system.

For example, the service data processing system 100 includes a subsystem 101, a subsystem 102, a subsystem 103, and a subsystem 104. The subsystem 101 may include a node device 1011, a node device 1012, and a node device 1013 that are deployed, for example, by a network service provider. In various examples, a node device can also be referred to as a node. The three node devices are respectively provided with a block chain system A, a block chain system B, and a block chain system C. The subsystem 102 may include a node device 1021, a node device 1022, and a node device 1023 that are deployed, for example, by a bank X. The three node devices are respectively provided with the block chain system A, the block chain system B, and the block chain system C. The subsystem 103 may include a node device 1031, a node device 1032, and a node device 1033 that are deployed, for example, by a bank Y. The three node devices are respectively provided with the block chain system A, the block chain system B, and the block chain system C. The subsystem 104 may include a node device 1041, a node device 1042, and a node device 1043 that are deployed, for example, by a regulator. The three node devices are respectively provided with the block chain system A, the block chain system B, and the block chain system C. Various subsystems may alternatively be deployed by the same service agent. Each node device may be provided as one computer device.

The block chain system A, the block chain system B, and the block chain system C serve different accounts. For example, the block chain system A is used to serve accounts in a region A, the block chain system B is used to serve accounts in a region B, and the block chain system C is used to serve accounts in a region C. For example, an account a in the region A transfers money to an account b in the region B. When receiving a transfer request from the account a, the service data processing system 100 may generate a contract for the account a, and executes an event when the transfer request conforms to a condition indicated by the contract. For example, when the node devices on the block chain system A reach a consensus on a generation event of the contract, the node devices on the block chain system B transfer money.

In an actual application scenario, each subsystem may further include at least one logical node device. A network connection is set between the logical node device and node devices in a subsystem in which the logical node device is located. The logical node device is configured to forward an interaction message between an account and a node device and an interaction message between node devices, and may further generate a cross-chain resource transfer request based on a resource transfer request when a resource is transferred between accounts served by different block chain systems. Specifically, a message of the account may be forwarded to node devices on the block chain system serving the account, and a consensus message of node devices on a block chain system may also be forwarded to node devices on another block chain system. Each block chain node device is configured to store a message (for example, a cross-chain resource transfer request or a consensus message) triggering one event into a block chain system. In an embodiment of the disclosure, each block chain system may independently run. Any two block chain systems do not affect each other. For example, at a current moment, the node device 1011 is a node device running in a leading state, and is configured to instruct a node device that runs in a following state and that is on the block chain system A how to work; and the node device 1022 is also a node device running in a leading state, and is configured to instruct a node device that runs in a following state and that is on the block chain system B how to run. In a selection process of the node devices on the block chain system A, the node device running in a leading state is switched, but this does not affect work of the node devices on the block chain system B. For example, the node devices on the block chain system B may normally work based on a node device in a leading state.

In an embodiment of the disclosure, a plurality of node devices provided with the same block chain system may further be provided with the same account table. The account table is used to store information about accounts served by the block chain system, for example, an account resource quantity, an account credit score, an account level, and a contract corresponding to the account. When the account initiates resource transfer, a contract corresponding to the account may be generated in the account table. The contract may include information such as a contract identifier, a resource receiving account, a block chain system identifier serving the resource receiving account, a contract state, and a transaction number. The contract identifier is used to uniquely identify one contract. The transaction number is used to uniquely identify one resource transfer process. When a resource transfer service amount is very large, to improve utilization of the contract identifier, a contract identifier of a contract in a finished state may be used again, and a transaction number is used to uniquely identify one resource transfer process.

The foregoing subsystem may alternatively be a computer device. To be specific, a plurality of block chain systems may be configured on the computer device, and the computer device executes a function executed by one subsystem.

Figure 2:
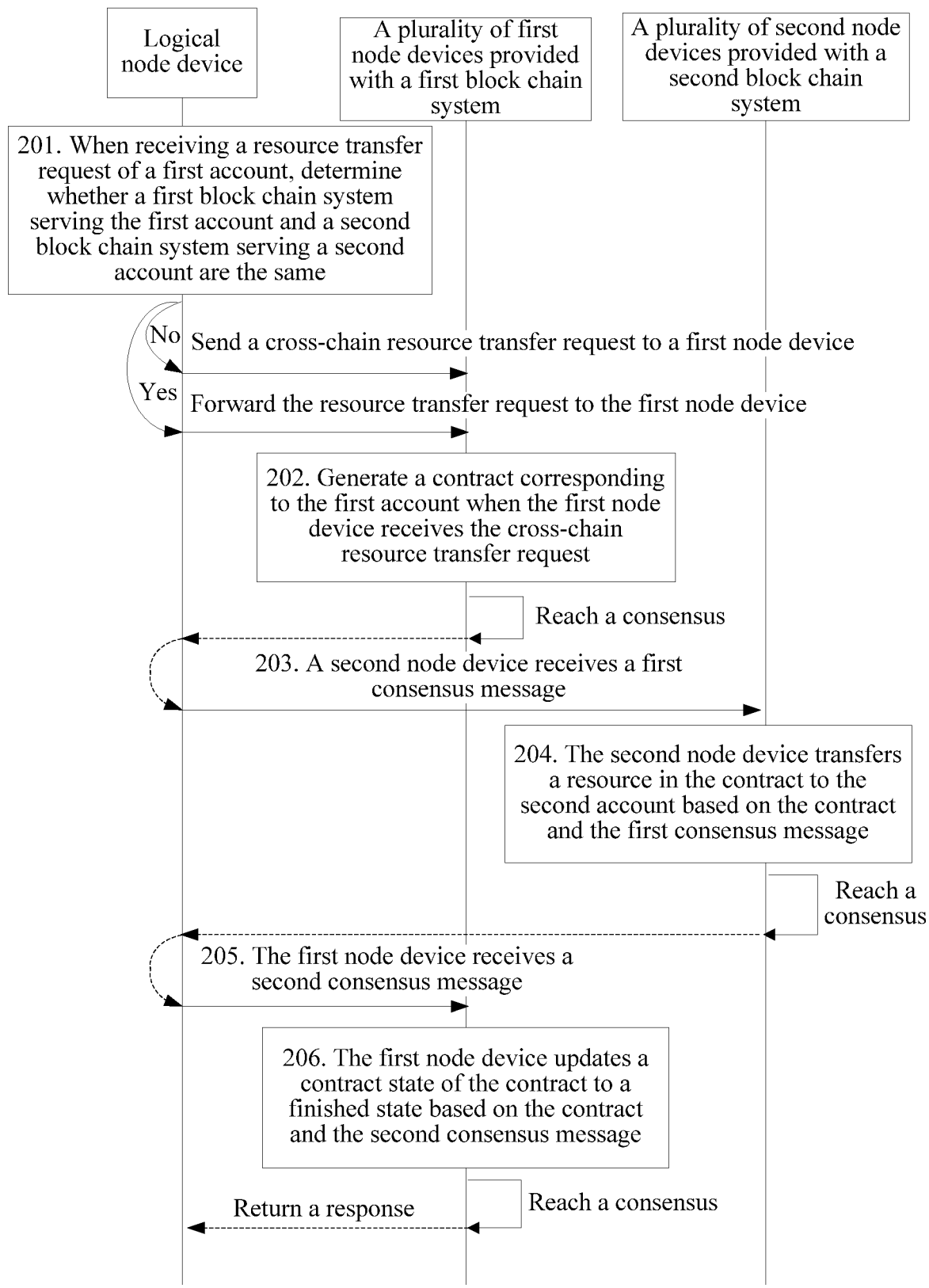
FIG. 2 is a flowchart of a resource transfer method according to the disclosure.

FIG. 2 is a flowchart of a resource transfer method according to the disclosure. The method may be applied to an interaction process of various node devices in the service data processing system 100 shown in FIG. 1, and includes the following steps:

In step 201, when receiving a resource transfer request or a transaction request of a first account, a logical node device determines whether a first block chain system serving the first account and a second block chain system serving a second account are the same, and if not, sends a cross-chain resource transfer request or a cross-chain transaction request to a first node device provided with a first block chain system; or if yes, forwards the resource transfer request or the transaction request to a first node device, the resource transfer request or the transaction request being used to request to transfer a resource in the first account to the second account.

The resource transfer request or the transaction request may include information such as the first account, a quantity of to-be-transferred resources, and a resource receiving account, namely, the second account. The cross-chain resource transfer request or the cross-chain transaction request is generated based on the resource transfer request or the transaction request, and is also used to request to transfer the resource in the first account to the second account, but is specifically configured to request to transfer a resource between accounts served by different block chain systems. The first node device (or the first node) is a node device (or a node) provided with the first block chain system. The first account and the second account may be provided with a service by the same block chain system, or may be provided with a service by different block chain systems, and the two cases are processed in different manners. Therefore, the logical node device is configured to determine block chain systems respectively serving the two accounts. Any suitable determining manner or embodiment can be used to determine the block chain systems serving the first and the second accounts in the disclosure. For example, the logical node device is provided with an account service table of each block chain. The account service table is used to record accounts served by the block chain system. A recording form may be that one block chain system identifier corresponds to a plurality of accounts. The logical node device may perform query in various account service table according to the first account, and find an account service table recording the first account. A block chain system corresponding to the account service table is the first block chain system serving the account. Similarly, the logical node device may perform query in various account service tables according to the second account, and find an account service table recording the second account. A block chain system corresponding to the account service table is the second block chain system serving the second account. Each block chain system may have a corresponding block chain system identifier, to differentiate different block chain systems.

In this step, the logical node device may determine whether a first block chain system identifier and a second block chain system identifier are the same. If the two are different, it indicates that the two accounts are served by different block chain systems, and can be processed by node devices on two block chain systems. Therefore, the logical node device may generate a cross-chain resource transfer request based on the first block chain system identifier, the second block chain system identifier, and the first account, the second account, and the quantity of to-be-transferred resources in the resource transfer request, and send the cross-chain resource transfer request to the first node device.

In addition, if the first block chain system identifier and the second block chain system identifier are the same, it indicates that the two accounts are served by the same block chain system. The logical node device may directly forward the resource transfer request to the first node device, and the first node device transfers a resource to the second account, as requested by the first account, and stores the resource transfer request to the first block chain system to record this transfer event of the resource.

The first account may also simultaneously initiate resource transfer to a plurality of second accounts. Therefore, the resource transfer request may also include a plurality of second accounts. For each second account, the logical node device may determine, based on the foregoing determining process, whether a block chain system serving each second account and a block chain system serving the first account are the same. If a block chain system of one second account and the block chain system serving the first account are different, a cross-chain resource transfer request may be generated, and is sent to the first block chain system.

In an actual application scenario, when the first block chain system and the second block chain system are configured in same computer device, functions of the first node device, the second node device, and the logical node device may all be integrated into the computer device. Then in a scenario in which this step is performed by the computer device, when receiving the resource transfer request of the first account, the computer device may determine whether the first block chain system serving the first account and the second block chain system serving the second account are the same, and if not, trigger a cross-chain resource transfer request; or if yes, store the resource transfer request to the first block chain system.

In step 202, when receiving the cross-chain resource transfer request, the first node device generates a contract corresponding to the first account on the first node device, the contract being used to indicate conditions for executing various events in this resource transfer process.

The contract refers to a code that can run on a block chain system and includes conditions that is configured by a person and that is used for executing various events. For example, when reaching a consensus on a generation event of the contract, a plurality of first node devices instructs the second node device to execute a transfer event of the resource. In this step, when receiving the resource transfer request, the computer device may generate the contract based on a configured contract template and information in the cross-chain resource transfer request. The contract may include information such as a contract identifier, a resource receiving account, an identifier of a block chain system serving the resource receiving account, a contract state (for example, an unfinished state), and a transaction number. In fact, a contract generation process is equivalent to transferring, to the contract, the resource that the first account requests to transfer. Therefore, in the contract generation process, the first node devices can be configured to operate an account resource quantity of the first account, and reduce the account resource quantity of the first account by a quantity of resources that the first account requests to transfer.

To record the generation event of the contract and prevent the account from denying an initiated resource transfer process, the first node device may generate a second block on a first block chain in the first block chain system based on the cross-chain resource transfer request, the contract, and a block header of a first block in the first block chain. In an example, the second block is generated based on the cross-chain resource transfer request, the contract, and a block header feature value of the first block in the first block chain. The first block is a previous block of the second block in the first block chain. The second block is used to record the generation event of the contract.

Specifically, the first node device may obtain all information in a block header of a first block from a configured first block chain, obtain a block header feature value of the first block based on all the information in the block header of the first block, calculate a feature value of a cross-chain resource transfer request (which may further include information about the contract and other information of the first account such as a remaining account resource quantity) to be stored into a block body of a second block, to obtain a block body feature value of the second block, and further store the block header feature value of the first block, the block body feature value of the second block (which may further include a version number, a difficulty value, and a timestamp) into a block header of the second block; and store the cross-chain resource transfer request (which may further include the information about the contract and the other information of the first account) into the block body of the second block to generate the second block, so that the second block and the first block are related by using the block header feature value of the first block. Therefore, blocks on a block chain are connected in series, so that tampering of any information in a block can be detected by tracing a block header feature value of a previous block stored in a block header of the block, thereby ensuring security of a resource transfer process. In consideration of possible mismatching between a format of the information about the contract (or information about the first account) and a storage format of information in a block chain, a feature value of the information about the contract (the information about the first account) may be calculated, and the feature value may be stored into a block.

In an actual application scenario, each first node device on the first block chain system can perform the foregoing block generation process, to ensure that most first node devices may store the same block chain, and when information in any first node device is lost or tampered, the information can be recovered by using other first node devices. In an embodiment of the disclosure, an event is executed based on a consensus of block chain node devices. The consensus of the block chain node devices means that block chain node devices corresponding to one block chain have finished the same event and stored information triggering the event into a new block. A consensus process of the step is used as an example:

When any first node device receives a cross-chain resource transfer request, the first node device may send the cross-chain resource transfer request to a node device (referred to as a leading node device below) that corresponds to the first block chain and that runs in a leading state. The leading node device forwards the cross-chain resource transfer request to each first node device. When each first node device receiving the cross-chain resource transfer request, the first node device may send an acknowledgment message to other first node devices when determining that the cross-chain resource transfer request conforms to a preset condition (for example, authenticating that the initiation node device is valid or authenticating that running logic is met). Further, when each first node device receives a preset quantity of acknowledgment messages, the first node device may generate a contract, generate a new block based on the cross-chain resource transfer request and information about the contract, and when the block is generated, return a first block finish message to the logical node device. When receiving first block finish messages of a preset quantity of first node devices, the logical node device may trigger a first consensus message. In an example, the preset quantity is a quantity (or a number) of node devices that has been configured and that reaches a requirement of a consensus. A specific value of the preset quantity is not limited in an embodiment of the disclosure. A PBFT-based block chain system is used as an example. A quantity of all block chain node devices corresponding to one block chain system is 3f+1, and the preset quantity may be a positive integer greater than or equal to 2f+1 and less than or equal to 3f+1, where f is any positive integer. When sending each interaction message, a node device may simultaneously send a signature for the interaction message by using a private key of the node device, so that a node device receiving the interaction message may perform authentication on an identity of an interaction message sender by using a public key corresponding to the private key. Therefore, when sending a first block finish message, the first node device may also send a signature for the first block finish message, so that the logical node device may perform authentication on an identity of the first node device, and trigger the first consensus message when the preset quantity of first node devices are authenticated.

When one computer device serves as an execution body, this step is equivalent to: generating the contract corresponding to the first account when the computer device receives the cross-chain resource transfer request.

In an embodiment, the resource is transferred to the second account based on the contract when a first plurality of first node devices in the first block chain reaches a consensus on a generation event of the contract, such as described in steps 203 and 204.

In step 203, a second node device receives a first consensus message, the first consensus message being triggered when a preset quantity (or a preset number) of first node devices finish a block corresponding to the generation event of the contract, and the first consensus message being used to indicate that the first node devices reach a consensus on the generation event of the contract. In an example, the first plurality of first node devices reaches the consensus on the generation event of the contract and a number of the first plurality of first node devices reaches the preset number.

In this step, the logical node device may send the first consensus message to the second node device, so that the second node device receives the first consensus message. The first consensus message may include signatures signed by the preset quantity of first node devices for the first block finish messages, the resource in the contract, namely, the quantity of to-be-transferred resources, the first account, the second account, and the transaction number.

When one computer device serves as an execution body, this step is equivalent to: receiving, by the computer device, the first block finishes messages of the preset quantity of first node devices, and generating the first consensus message.

In step 204, the second node device transfers the resource in the contract to the second account based on the contract and the first consensus message.

In this step, the second node device may extract information from the received first consensus message based on the first consensus message, query, based on a transaction number, whether the transaction number has been stored in the second account to determine whether to repeatedly execute resource transfer, and if yes, return information indicating repeated execution to the logical node device, or if not, increase the quantity of resources in the contract to a quantity of account resources of the second account, and correspondingly store the transaction number and the second account.

Step 203 and step 204 are a specific process of an embodiment of the disclosure in which the second node device transfers the resource in the contract to the second account based on the contract when the first node devices reach a consensus on the generation event of the contract.

To record the transfer event of the resource, and prevent the account from denying a received resource, the second node device may generate a fourth block on a second block chain in the second block chain system based on the first consensus message, the second account after the resource transfer, and a block header of a third block on the second block chain. In an example, the fourth block is generated based on the first consensus message, the second account after the resource transfer, and a block header feature value of the third block. The third block is a previous block of the fourth block. The fourth block is used to record the transfer event of the resource.

Specifically, the second node device may obtain all information in a block header of a third block from a configured second block chain, obtain a block header feature value of the third block based on all the information in the block header of the third block, calculate a feature value of a first consensus message (which may further include information about the second account such as an account resource quantity) to be stored into a block body of a fourth block, to obtain a block body feature value of the fourth block, and further store the block header feature value of the third block, the block body feature value of the fourth block (which may further include a version number, a difficulty value, and a timestamp) into a block header of the fourth block; and store the first consensus message (which may further include the information about the second account) into the block body of the fourth block to generate the fourth block, so that the fourth block and the third block are related by using the block header feature value of the third block. Therefore, blocks on a block chain are connected in series, so that tampering of any information in a block can be detected by tracing a block header feature value of a previous block stored in a block header of the block, thereby ensuring security of a resource transfer process. In consideration of possible mismatching between a format of the information about the account and a storage format of information in a block chain, a feature value of the information about the second account may be calculated, and the feature value may be stored into a block.

In a consensus process corresponding to this step: When any second node device receives a first consensus message, the second node device may send the first consensus message to a leading node device corresponding to the second block chain. The leading node device forwards the first consensus message to each second node device. When each second node device receives the first consensus message, the second node device may send an acknowledgment message to other second node devices. Further, when each second node device receives a preset quantity of acknowledgment messages, the second node device may transfer the resource in the contract to the second account, generate an information block based on the first consensus message and information about the second account, and when the block is generated, return a second block finish message to the logical node device. When receiving second block finish messages of a preset quantity of second node devices, the logical node device may trigger a second consensus message. Certainly, when sending the second block finish message, the second node device may simultaneously send a signature for the second block finish message.

When one computer device serves as an execution body, this step is equivalent to: transferring, by the computer device, the resource in the contract to the second account based on the contract and the first consensus message.

In step 205, the first node device receives the second consensus message, the second consensus message being triggered when a preset quantity (or a preset number) of second node devices finishes a block corresponding to the transfer event of the resource, and the second consensus message being used to indicate that the second node devices reach a consensus on the transfer event of the resource. In an example, when the plurality of second nodes that reaches the consensus on the transfer event of the resource reaches a preset number, the second consensus message is triggered.

In this step, the logical node device may send the second consensus message to the first node device, so that the first node device receives the second consensus message. The second consensus message may include signatures signed by the preset quantity of second node devices for the second block finish messages, the first account, the second account, and the transaction number.

When one computer device serves as an execution body, this step is equivalent to: generating, by the computer device, the second consensus message based on the received second block finish messages of the preset quantity of second node devices.

In step 206, the first node device updates a contract state of the contract to a finished state (or being finished) based on the contract and the second consensus message, and the preset quantity of first node devices trigger a third consensus message when finishing a block corresponding to the state update event (or a status update event) of the contract, the third consensus message being used to indicate that the first node devices reach a consensus on the state update event of the contract. In an example, the third consensus message is triggered when the second plurality of first node devices reaches a preset number. The third consensus message is used to indicate that the second plurality of first node devices reaches the consensus on the state update event of the contract.

In this step, the first node device may extract information from the received second consensus message based on the second consensus message, query a contract corresponding to transaction number in the first account based on the transaction number, and update the contract state of the contract to the finished state.

Step 205 and step 206 are a specific process in an embodiment of the disclosure in which the first node devices update the contract state of the contract to the finished state based on the contract when the second node devices reach a consensus on the transfer event of the resource, and reach a consensus on the state update event of the contract.

Figure 3:
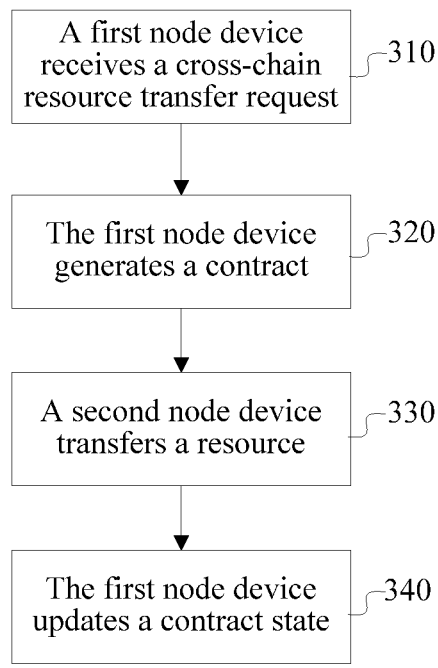
FIG. 3 is a flowchart of resource transfer according to the disclosure.

Based on the foregoing resource transfer process, FIG. 3 is a flowchart of resource transfer according to an embodiment of the disclosure. This resource transfer procedure may be divided into four steps 310, 320, 330, and 340. First, in step 310, first node devices receive a cross-chain resource transfer request. Then, in step 320, the first node devices generate a contract. Further, in step 330, the first node devices trigger second node devices to transfer a resource when reaching a consensus on a generation time of the contract. Finally, in step 340, a consensus of the second node devices triggers the first node devices to update a contract state.

To record the state update event of the contract, and prevent the account from denying a finished resource transfer process, the first node device may generate a sixth block on the first block chain based on the second consensus message and a block header of a fifth block on the first block chain, and reach a consensus on the state update event of the contract. In an example, the first node device may generate the sixth block on the first block chain based on the second consensus message and a block header feature value of the fifth block on the first block chain. The fifth block is a previous block of the sixth block. The second consensus message is used to indicate that the second node devices reach a consensus on transferring a resource. The sixth block is used to record the state update event of the contract.

Specifically, the first node device may obtain all information in a block header of a fifth block from a configured first block chain, obtain a block header feature value of the fifth block based on all the information in the block header of the fifth block, calculate a feature value of a second consensus message (which may further include information about the contract such as a contract state and information about the first account such as an account resource quantity) to be stored into a block body of a sixth block, to obtain a block body feature value of the sixth block, and further store the block header feature value of the fifth block, the block body feature value of the sixth block (which may further include a version number, a difficulty value, and a timestamp) into a block header of the sixth block; and store the second consensus message (which may further include the information about the contract and the information about the account) into the block body of the sixth block to generate the sixth block, so that the sixth block and the fifth block are related by using the block header feature value of the fifth block. Therefore, blocks on a block chain are connected in series, so that tampering of any information in a block can be detected by tracing a block header feature value of a previous block stored in a block header of the block, thereby ensuring security of a resource transfer process. In consideration of possible mismatching between a format of the information about the contract or the information about the account and a storage format of information in a block chain, a feature value of the information about the contract and a feature value of the information about the first account may be calculated, and the feature values may be stored into a block.

In a consensus process corresponding to this step: When any first node device receives a second consensus message, the first node device may send the second consensus message to a leading node device corresponding to the first block chain. The leading node device forwards the second consensus message to each first node device. When each first node device receives the second consensus message, the first node device may send an acknowledgment message to other first node devices. Further, when each first node device receives a preset quantity of acknowledgment messages, the first node device may update the contract state of the contract to a finished state, generate a new block based on the second consensus message and information about the contract, and when the block is generated, return a third block finish message to the logical node device. When receiving third block finish messages of a preset quantity of first node devices, the logical node device may generate a third consensus message. Certainly, when sending the third block finish message, the first node device may simultaneously send a signature for the third block finish message. The logical node device may receive the third block finish messages of the preset quantity of first node devices, and use the received messages as the third consensus message, to indicate that this resource transfer process has been finished.

In an embodiment of the disclosure, a resource is transferred between accounts served by different block chain systems, a contract is generated to indicate conditions for executing various events in this resource transfer process. After the first node devices reach a consensus on a generation event of the contract, the first node devices transfer a resource in the contract to a second account based on the contract, and updates the contract state of the contract to a finished state after second node devices reach a consensus on a transfer event of the resource. Therefore, the resource is transferred based on consensus processes reached by the two different block chain systems, and a method for transferring a resource between accounts served by different block chain systems is provided. Moreover, because the transfer event of the resource and a state update event of the contract are executed based on the consensus of block chain systems without intervening of an intermediate node device, an advantage of decentralizing the block chain systems is still maintained, and credibility and reliability of executing the event are improved.

In addition, for an account involved in a resource transfer process, block chain node devices serving the account all participate in an event, and trigger recording of an interaction message of the event to a block chain, to prevent the account from denying a finished event or automatically recover a tampered record from other block chain node devices, and further ensure reliability of the resource transfer process.

When one computer device serves as an execution body, this step is equivalent to: updating, by the computer device, the contract state of the contract to the finished state based on the contract and the second consensus message, the third consensus message being triggered by the preset quantity of first node devices when the first node devices finish a block corresponding to the state update event of the contract.

To make two account interaction parties learn of this resource transfer process, when the foregoing resource process is finished, the first node device may return a resource transfer success message to the first account, and the second node device may push a resource transfer prompt to the second account.

In actual application scenario, a block chain node device may abnormally run. For example, although the first node device has finished the block corresponding to the generation event of the contract, because the first block chain system is switching a leading node device, a response (namely, the first block finish message) fed back to the logical node device is lost, and the logical node device cannot trigger the first consensus message, and cannot send the first consensus message to the second node device. As a result, the second node device can perform the transfer event of the resource. To resolve the foregoing abnormal phenomenon, the logical node device may automatically trigger a contract state query message, and send the contract state query message to the block chain node device. The contract state query message is used to query whether a contract in an unfinished state exists on the block chain node device. Querying a contract on the first node device is used as an example. The first node device may receive the contract state query message from the logical node device, so that the preset quantity of first node devices triggers the first consensus message when determining that the contract state of the contract is the unfinished state. A period of the query process is not limited in the disclosure. In an embodiment, when a plurality of first node devices indicating that the contract status is unfinished reaches a preset number, the first consensus message is triggered where the first consensus message is used to indicate that the first plurality of first node devices reaches the consensus on the generation event of the contract.

In the foregoing example, when any first node device receives the contract state query message, the first node device may forward the contract state query message to the leading node device. The leading node device forwards the contract state query message to the first node devices. When each first node device receives the contract state query message, the first node device may send an acknowledgment message to other first node devices. Further, when each first node device receives a preset quantity of acknowledgment messages, the first node device may query whether a contract in an unfinished state exists, if yes, return, to the logical node device, a message indicating that a contract is to be executed. The message indicating that a contract is to be executed includes information about the contract. When receiving messages indicating that a contract is to be executed of the preset quantity of first node devices, the logical node device may trigger the first consensus message. Further, the logical node device may send the first consensus message to a block chain node device that serves a resource receiving account in the contract. A subsequent step is similar to step 204.

In addition to the foregoing abnormal phenomenon, when the second block chain system has finished the block corresponding to the transfer event of the resource, if the second block chain system is switching the leading node device, a response (namely, the second block finish message) fed back to the logical node device may be lost, the logical node device possibly cannot trigger the second consensus message, and cannot update the contract state. Therefore, to resolve the abnormal phenomenon, the logical node device may automatically trigger a resource transfer state query message, and send the resource transfer state query message to the block chain node device. The resource transfer state query message is used to query whether an event of transferring a resource to the resource receiving account is finished, and may include a transaction number. Querying a transfer event of a resource of the second account is used as an example. The second node device may receive the resource transfer state query message from the logical node device, so that the preset quantity of second node devices trigger the second consensus message when determining the resource is transferred. A period of the query process is not limited in the disclosure. In an embodiment, when receiving confirmations from a preset number of second node devices that the transfer event of the resource is completed, the second consensus message is triggered where the second consensus message can indicate that the plurality of second node devices reaches the consensus on the transfer event of the resource.

In the foregoing example, when any second node device receives a resource transfer state query message, the second node device may forward the resource transfer state query message to a leading node device. The leading node device forwards the resource transfer state query message to the second node devices. When each second node device receives the resource transfer state query message, the second node device may send an acknowledgment message to other second node devices. Further, when each second node device receives a preset quantity of acknowledgment messages, the second node device may query whether the resource has been transferred to the second account, for example, query whether the transaction number has been recorded on the second block chain. For each second node device, if a query result is yes, the second node device may return a resource transfer event finish message to the logical node device. The resource transfer event finish message includes the transaction number. When receiving resource transfer event finish messages of the preset quantity of second node devices, the logical node device may trigger the second consensus message. Further, the logical node device may send the second consensus message to a block chain node device that corresponds to the transaction number and that initiates the resource transfer. A subsequent step is similar to step 206.

Based on the foregoing query process, a self-checking mechanism of a block chain node device in a running process is provided, to specially resolve problems that a response is lost, a next event cannot be performed, and a resource transfer process is interrupted in a resource transfer process, thereby ensuring completeness and reliability of the resource transfer process.

Figure 4:
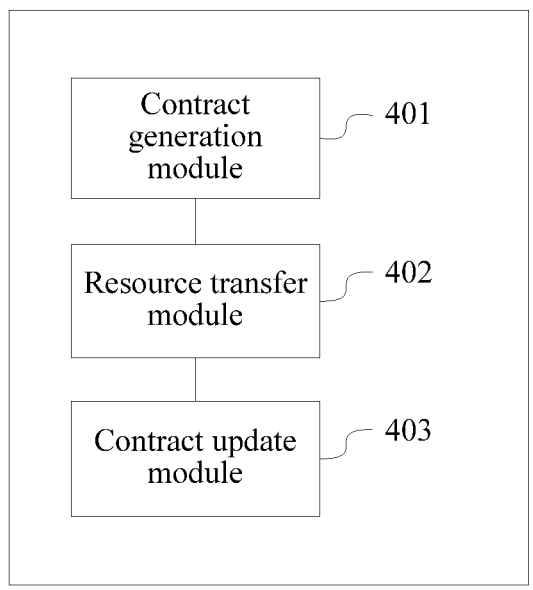
FIG. 4 is a block diagram of a resource transfer apparatus according to the disclosure.

FIG. 4 is a block diagram of a resource transfer apparatus according to the disclosure. Referring to FIG. 4, the apparatus specifically includes:

a contract generation module 401, configured to generate, when receiving a cross-chain resource transfer request of a first account, a contract corresponding to the first account on a first node device provided with a first block chain system, the cross-chain resource transfer request being used to request to transfer a resource in the first account to a second account, and the contract being used to indicate conditions for executing various events in this resource transfer process;

a resource transfer module 402, configured to transfer the resource in the contract to the second account based on the contract when a plurality of first node devices reaches a consensus on a generation event of the contract; and a contract update module 403, configured to update a contract state of the contract to a finished state based on the contract when a plurality of second node devices provided with a second block chain system reaches a consensus on a transfer event of the resource, and reach a consensus on a state update event of the contract by using the plurality of first node devices;

the first block chain system providing a service for the first account, the second block chain system providing a service for the second account, and the first block chain system and the second block chain system being different.

In an embodiment of the disclosure, when a resource is transferred between accounts served by different block chain systems, a contract is generated to indicate conditions for executing various events in this resource transfer process. After first node devices reach a consensus on a generation event of the contract, the first node devices transfer a resource in the contract to a second account based on the contract. After reaching a consensus on the transfer event of the resource, the second node devices update a contract state of the contract to a finished state. Therefore, the resource is transferred based on consensus processes reached by the two different block chain systems, and a method of transferring a resource between accounts served by the different block chain systems is provided. Moreover, because the transfer event of the resource and a state update event of the contract are executed based on the consensus of the block chain systems without intervening of an intermediate node device, an advantage of decentralizing the block chain systems is still maintained, and credibility and reliability of executing the event are improved.

Figure 5:
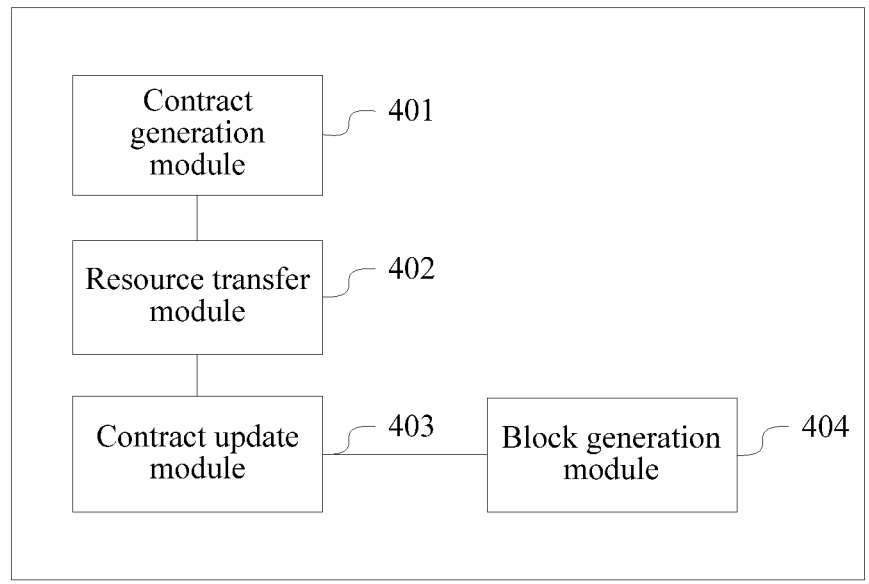
FIG. 5 is a block diagram of a resource transfer apparatus according to the disclosure.

In a possible implementation, based on the composition of the apparatus shown in FIG. 4, referring to FIG. 5, the apparatus further includes:

the contract update module 403, configured to update the contract state of the contract to the finished state based on the contract when the second node devices reach a consensus on the transfer event of the resource; and a block generation module 404, configured to: generate a sixth block on the first block chain based on a second consensus message and a block header feature value of a fifth block on the first block chain, and reach a consensus on the state update event of the contract by using the first node devices, the fifth block being a previous block of the sixth block, the second consensus message being used to indicate that the second node devices reach a consensus on transferring the resource, and the sixth block being used to record the state update event of the contract.

In a possible implementation, the resource transfer module 402 is configured to:

receive a first consensus message, the first consensus message being triggered when a preset quantity of first node devices finish a block corresponding to the generation event of the contract, and the first consensus message being used to indicate that the first node devices reach a consensus on the generation event of the contract; and transfer the resource in the contract to the second account based on the contract and the first consensus message.

In a possible implementation, the contract update module 403 is configured to:

receive a second consensus message, the second consensus message being triggered when a preset quantity of second node devices finish a block corresponding to the transfer event of the resource, and the second consensus message being used to indicate that the second node devices reach a consensus on the transfer event of the resource; and update the contract state of the contract to the finished state based on the contract and the second consensus message, and triggering, by the preset quantity of first node devices, a third consensus message when the preset quantity of first node devices finish a block corresponding to the state update event of the contract, the third consensus message being used to indicate that the first node devices reach a consensus on the state update event of the contract.

Figure 6:
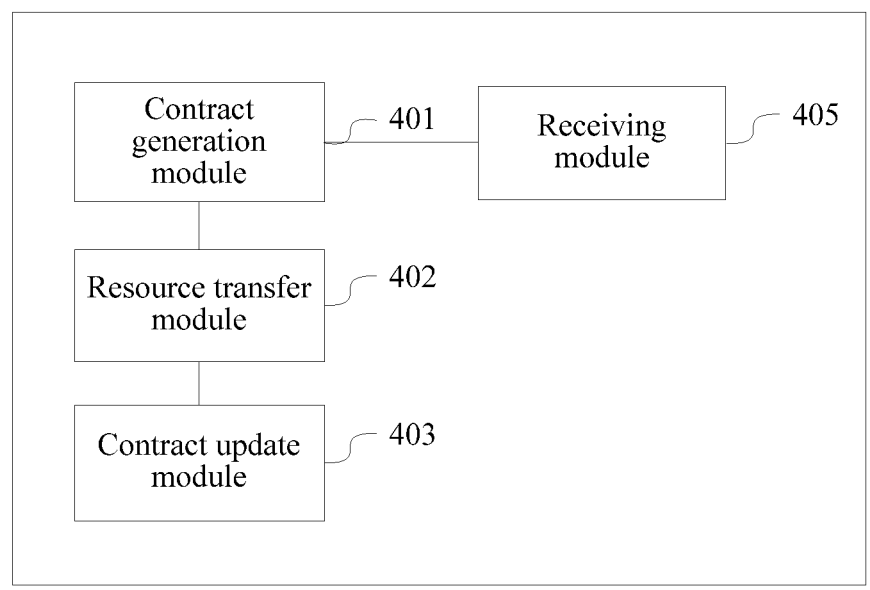
FIG. 6 is a block diagram of a resource transfer apparatus according to the disclosure.

In a possible implementation, based on the composition of the apparatus shown in FIG. 4, referring to FIG. 6, the apparatus further includes:

a receiving module 405, configured to receive a contract state query message, so that the preset quantity of first node devices trigger the first consensus message when determining that the contract state of the contract is an unfinished state, the first consensus message being used to indicate that the first node devices reach a consensus on the generation event of the contract.

An optional embodiment of the disclosure may be formed by using any combination of all the foregoing optional technical solutions, and details are not described herein.

When the resource transfer apparatus provided in the foregoing embodiment transfers a resource, only an example of division of the foregoing functional modules is described, and in actual application, the foregoing functions may be implemented by different functional modules, that is, the internal structure of the apparatus is divided into different functional modules, to implement all or some of the functions described above. In addition, the resource transfer apparatus and resource transfer method embodiments provided in the foregoing embodiments belong to one conception. For a specific implementation process, refer to the method embodiments, and details are not described herein again.

Figure 7:
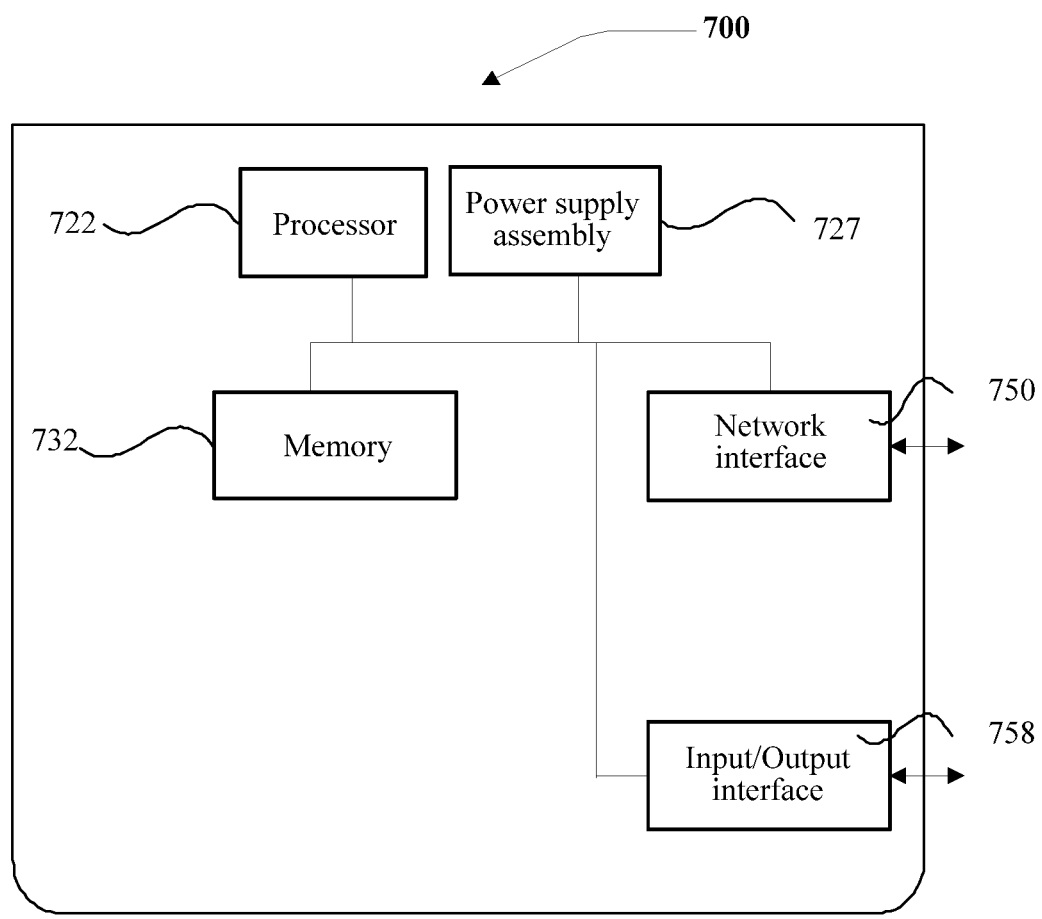
FIG. 7 is a block diagram of a computer device 700 according to the disclosure.

FIG. 7 is a block diagram of a computer device 700 according to the disclosure. For example, the computer device 700 may be provided as a server. Referring to FIG. 7, the computer device 700 includes a processor 722 and a memory 732. The memory 732 stores at least one instruction, at least one program, and a code set or an instruction set. The at least one instruction, the at least one program, and the code set or the instruction set are loaded and executed by the processor 722 (e.g., processing circuitry) to implement the foregoing resource transfer method.

The computer device 700 may further include a power supply assembly 727, configured to perform power supply management of the computer device 700, a wired or wireless network interface 750, configured to connect the computer device 700 to a network, and an input/output (I/O) interface 758. The apparatus 700 may operate an operating system stored in the memory 732, for example, Windows Server™, Mac OS X™, Unix™, Linux™, or FreeBSD™.

In an exemplary embodiment, a storage medium is further provided. The storage medium is, for example, a memory including at least one instruction, at least one program, and a code set or an instruction set. The at least one instruction, the at least one program, and the code set or the instruction set may be loaded and executed by a processor in the computer device to implement the resource transfer method in the embodiment. For example, the storage medium may be a non-transitory computer-readable storage medium such as ROM, a RAM, a CD-ROM, a magnetic tape, a floppy disk, an optical data storage device.

A person of ordinary skill in the art may understand that all or some of the steps of the foregoing embodiments may be implemented by using hardware, or may be implemented by a program instructing relevant hardware. The program may be stored in a computer readable storage medium. The above-mentioned storage medium may be a read-only memory, a magnetic disk, an optical disc, or the like.

The foregoing descriptions are merely embodiments of the application, but are not intended to limit the disclosure. Any modification, equivalent replacement, or improvement made within the spirit and principle of the disclosure shall fall within the protection scope of the disclosure.

What is claimed is:

1. A method, comprising:
receiving, by a second blockchain system, a first consensus message from a first blockchain system, the first blockchain system including first nodes that provide services to at least a first account, and the second blockchain system including second nodes that provide services to at least a second account, the first consensus message indicating a first plurality of the first nodes reaches a consensus of a task for transferring a resource from the first account to the second account;
transferring, by the second blockchain system, the resource in the task to the second account in response to the first consensus message, the transferring including that a node in the second nodes of the second blockchain system adds the resource to the second account and generates a fourth block that records a completion of a transfer event of the resource at the node; and
transmitting, from the second blockchain system to the first blockchain system, a second consensus message, in response to a second plurality of the second nodes completing the transfer event, the second consensus message causing the first blockchain system to update a task status of the task to finished.

2. The method of claim 1, wherein:
a node in the first nodes removes the resource from the first account, and generates a second block in a first blockchain of the first blockchain system, the second block storing a generation event of the task at the node in the first nodes for the consensus of the task.

3. The method of claim 2, wherein:
the second block is generated based on a cross-chain transaction request and a block header of a first block in the first blockchain of the first blockchain system, the first block being a previous block of the second block in the first blockchain.

4. The method of claim 1, wherein:
the node in the second nodes of the second blockchain system generates, based on the first consensus message and a block header of a third block in a second blockchain of the second blockchain system, the fourth block in the second blockchain, the third block being a previous block of the fourth block in the second blockchain.

5. The method of claim 1, wherein:
a node in the first nodes generates a sixth block based on the second consensus message and a block header of a fifth block in a first blockchain of the first blockchain system, the fifth block being a previous block of the sixth block in the first blockchain.

6. The method of claim 1, wherein:
the first consensus message indicates that the first plurality of the first nodes reaches a preset number.

7. The method of claim 1, wherein the transmitting the second consensus message comprises:
transmitting the second consensus message when the second plurality of the second nodes reaches a preset number.

8. The method of claim 1, wherein:
the first blockchain system triggers a third consensus message to the second blockchain system when a second plurality of the first nodes reaches a preset number, the third consensus message indicating that the second plurality of the first nodes have updated the task status of the task.

9. The method of claim 1, further comprising:
performing, in the second blockchain system, a query of a task status to the second nodes; and
in response to a determination that a number of the second nodes having completed the transfer event reaches a preset number, triggering the second consensus message to the first blockchain system.

10. The method of claim 1, wherein:
the first blockchain system performs a query of a task status to the first nodes; and
in response to a determination that a number of the first nodes having the task status as unfinished, the first blockchain system generates the first consensus message.

11. An apparatus in a second blockchain system, comprising processing circuitry configured to:
receive a first consensus message from a first blockchain system, the first blockchain system including first nodes that provide services to at least a first account, and the second blockchain system including second nodes that provide services to at least a second account, the first consensus message indicating a first plurality of the first nodes reaches a consensus of a task for transferring a resource from the first account to the second account;
transfer the resource in the task to the second account in response to the first consensus message, the transfer including that a node in the second nodes of the second blockchain system adds the resource to the second account and generates a fourth block that records a completion of a transfer event of the resource at the node; and
transmit, from the second blockchain system to the first blockchain system, a second consensus message, in response to a second plurality of the second nodes completing the transfer event, the second consensus message causing the first blockchain system to update a task status of the task to finished.

12. The apparatus of claim 11, wherein:
a node in the first nodes removes the resource from the first account, and generates a second block in a first blockchain of the first blockchain system, the second block recording a generation event of the task at the node in the first nodes for the consensus of the task.

13. The apparatus of claim 12, wherein:
the second block is generated based on a cross-chain transaction request and a block header of a first block in the first blockchain of the first blockchain system, the first block being a previous block of the second block in the first blockchain.

14. The apparatus of claim 11, wherein:
the node in the second nodes of the second blockchain system generates, based on the first consensus message and a block header of a third block in a second blockchain of the second blockchain system, the fourth block in the second blockchain, the third block being a previous block of the fourth block in the second blockchain.

15. The apparatus of claim 11, wherein:
a node in the first nodes generates a sixth block based on the second consensus message and a block header of a fifth block in a first blockchain of the first blockchain system, the fifth block being a previous block of the sixth block in the first blockchain.

16. The apparatus of claim 11, wherein:
the first consensus message indicates that the first plurality of the first nodes reaches a preset number.

17. The apparatus of claim 11, wherein the processing circuitry is configured to:
transmit the second consensus message when the second plurality of the second nodes reaches a preset number.

18. The apparatus of claim 11, wherein:
the first blockchain system triggers a third consensus message to the second blockchain system when a second plurality of the first nodes reaches a preset number, the third consensus message indicating that the second plurality of the first nodes have updated the task status of the task.

19. The apparatus of claim 11, wherein the processing circuitry is configured to:
perform, in the second blockchain system, a query of a task status to the second nodes; and
in response to a determination that a number of the second nodes having completed the transfer event reaches a preset number, trigger the second consensus message to the first blockchain system.

20. A non-transitory computer-readable medium storing computer-readable instructions, which, when executed by one or more processors of a second blockchain system, cause the one or more processors to perform:
receiving a first consensus message from a first blockchain system, the first blockchain system including first nodes that provide services to at least a first account, and the second blockchain system including second nodes that provide services to at least a second account, the first consensus message indicating a first plurality of the first nodes reaches a consensus of a task for transferring a resource from the first account to the second account;
transferring the resource in the task to the second account in response to the first consensus message, the transferring including that a node in the second nodes of the second blockchain system adds the resource to the second account and generates a fourth block that records a completion of a transfer event of the resource at the node; and
transmitting a second consensus message to the first blockchain system, in response to a second plurality of the second nodes completing the transfer event, the second consensus message causing the first blockchain system to update a task status of the task to finished.

* * * * *